United States Patent
Ku et al.

(10) Patent No.: US 12,457,629 B2
(45) Date of Patent: Oct. 28, 2025

(54) APPARATUS AND METHOD FOR FREQUENCY ALLOCATION USING REINFORCED LEARNING FOR LOW EARTH ORBIT SATELLITE NETWORK

(71) Applicant: Electronics and Telecommunications Research Institute, Daejeon (KR)

(72) Inventors: Bon Jun Ku, Daejeon (KR); Dae Sub Oh, Daejeon (KR); Chang Hee Joo, Seoul (KR); Ji Hyeon Yun, Seoul (KR); Tae Gun An, Seoul (KR); Hae Sung Jo, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 443 days.

(21) Appl. No.: 17/978,653

(22) Filed: Nov. 1, 2022

(65) Prior Publication Data

US 2023/0132791 A1    May 4, 2023

(30) Foreign Application Priority Data

Nov. 1, 2021   (KR) .................. 10-2021-0148166
Sep. 16, 2022  (KR) .................. 10-2022-0116858

(51) Int. Cl.
*H04W 72/541*   (2023.01)
*G06N 3/006*    (2023.01)
(Continued)

(52) U.S. Cl.
CPC .......... *H04W 72/541* (2023.01); *G06N 3/006* (2013.01); *G06N 20/00* (2019.01);
(Continued)

(58) Field of Classification Search
CPC .......... H04W 72/541; H04W 72/0453; G06N 20/00; G06N 3/006; H04B 7/18539; H04B 7/1851
See application file for complete search history.

(56) References Cited

U.S. PATENT DOCUMENTS

| | | | |
|---|---|---|---|
| 8,169,967 B2 | 5/2012 | Lee et al. | |
| 2016/0205675 A1* | 7/2016 | Zhang | H04W 4/06 455/450 |

(Continued)

FOREIGN PATENT DOCUMENTS

| | | | | |
|---|---|---|---|---|
| CN | 111970047 A | * | 11/2020 | ......... H04B 7/18539 |
| CN | 110809292 B | * | 3/2021 | ............ H04W 28/08 |

(Continued)

OTHER PUBLICATIONS

Zheng et al., "LEO satellite channel allocation method based on reinforcement learning (English)", Nov. 20, 2020, ip.com, 14 Pages (Year: 2020).*

(Continued)

*Primary Examiner* — Brian J. Gillis
*Assistant Examiner* — Chhian (Amy) Ling
(74) *Attorney, Agent, or Firm* — KILE PARK REED & HOUTTEMAN PLLC

(57) ABSTRACT

A frequency resource allocation apparatus comprising a processor is configured to select resources for transmitting a signal to a user based on a learning model, allocate the selected resources to the user, transmit the signal to the user using the selected resources, receive information about whether the transmission of the signal is successful or not from the user via a feedback channel after a delayed time, and update an internal parameter of the learning model with respect to the resources used for transmitting the signal.

14 Claims, 9 Drawing Sheets

Example of Channel Allocation

(51) Int. Cl.
*G06N 20/00* (2019.01)
*H04B 7/185* (2006.01)
*H04W 72/0453* (2023.01)

(52) U.S. Cl.
CPC ....... *H04B 7/1851* (2013.01); *H04B 7/18539* (2013.01); *H04W 72/0453* (2013.01)

(56) References Cited

U.S. PATENT DOCUMENTS

| | | | |
|---|---|---|---|
| 2021/0044985 A1 | 2/2021 | Kim et al. | |
| 2021/0142196 A1* | 5/2021 | R .......................... | G06F 16/258 |
| 2021/0160007 A1 | 5/2021 | Choi et al. | |
| 2023/0368584 A1* | 11/2023 | Jung ...................... | G06N 20/00 |

FOREIGN PATENT DOCUMENTS

| KR | 10-2019-0098591 | 8/2019 |
|---|---|---|
| KR | 10-2020-0145683 | 12/2020 |
| KR | 10-2021-0057497 | 5/2021 |
| KR | 10-2021-0064741 | 6/2021 |

OTHER PUBLICATIONS

Zhao, "Deep Reinforcement Learning Based Approach for Energy-Efficient Channel Allocation in Satellite Internet of Things", Mar. 12, 2020, p. 62197-62206, Total 10 Pages. (Year: 2020).*
Fei et al., CN 110809292 B, "Combined Switching Method Based On Load Balancing In Low-orbit Satellite Communication", Feb. 18, 2020 (Year: 2020).*
Djorwe Temoa et al., "A Reinforcement Learning Based Intercell Interference Coordination in LTE Networks," future Internet, Jan. 17, 2019, pp. 1-23.
Fei Zheng et al., "LEO Sattelite Channel Allocation Scheme Based on Reinforcement Learning," Hindawi Mobile Information Systems, vol. 2020, Dec. 12, 2020, pp. 1-10.

* cited by examiner

FIG. 6

```
Overall procedure
 1: procedure Simulate():
 2:   user configurations of for agn_sat, existing_sat
 3:   for t = 1, ..., T do:
 4:     RB_existing ← Allocate_RB(existing_sat, P)
 5:     RB_agent ← Allocate_AgentRB(agn_sat, feedback)
 6:     signals ← agn_sat.send(RB_agent), existing_sat.send(RB_existing)
 7:     CNIR ← user.receive(signals)
 8:     agnsat.receive(CNIR) with delay
 9:     PostProcess(t)
10:   end for
11: end procedure 14: procedure user.receive(signals):
16:   for signal in signals do:
17:     if signal.frequency == user.frequency then:
18:       if signal.user == user then:
19:         P_s ← signal.power * user.gain * losses
20:       else:
21:         P_I ← signal.power * user.gain * losses * sidelobe_attn
22:       end if
23:     end if
24:   end for
25:   CNIR ← (P_s/(P_I + kTB))
26:   return CNIR
27: end procedure
```

FIG. 7

Agn_sat resource allocation

1: procedure Allocate_AgentRB():
   /* Select frequency block */
2:    for all $i \in [N+1]$ do:     #Consider N+1 (N frequencies + no transmit) arms
3:        $UCB(i) \leftarrow \hat{\mu}_i(t-1) + \sqrt{\dfrac{2\log(1+t \cdot \log^2 t)}{\tau_i(t-1)}}$
4:    end for
5:     $\bar{i} \leftarrow argmax_i UCB(i)$     #temporary decision based only on UCB index
6:     $\tilde{u}_t^i = 0 \; for \; all \; i \neq \bar{i} \; and \; \tilde{u}_t^{\bar{i}} = 1$
   /* Allocate frequency block */
6:    if $P_{\bar{i}}^{A_{execute}} \leq \bar{c}_{\bar{i}}/P_{\bar{i}}^{A}$ then :     #actual decision considering collision constraint
7:        $u_t^i = 0 \; for \; all \; i \neq \bar{i} \; and \; u_t^{\bar{i}} = 1$
8:    else:
9:        $u_t^i = 0 \; for \; all \; i \in [N+1]$
10:    end if
10: end procedure

FIG. 8

Agn_sat resource allocation

1: procedure PostProcess(t):
2:    /* Update $P_i^{A\_execute}$ */
      $P_i^{A\_execute} = \sum_{n=1}^{t} \bar{\bar{u}}_n^i / \sum_{n=1}^{t} \bar{u}_n^i$
3:    /* Update $P_i^A$ */
      for $i \in [N]$ do:
4:       $P_i^A = \sum_{n=1}^{t} \bar{\bar{u}}_n^i / t$
5:    end for
   /* Update internal parameters */
6:    for $i$ such that $u_t^i = 1$ do
7:       $\tau_i(t+1) = \tau_i(t) + u_t^i$
8:       $\mu_i(t+1) = \mu_i(t)\left(1 - \frac{1}{\tau_i(t)}\right) + \frac{reward(0\ or\ 1)}{\tau_i(t)}$
9:    end for
10: end procedure

APPARATUS AND METHOD FOR FREQUENCY ALLOCATION USING REINFORCED LEARNING FOR LOW EARTH ORBIT SATELLITE NETWORK

CROSS REFERENCE TO RELATED APPLICATION

The present application claims priority to Korean Patent Application No. 10-2021-0148166, filed Nov. 1, 2021, and the Korean Patent Application No. 10-2022-0116858, filed Sep. 16, 2022, the entire contents of which is incorporated herein for all purposes by this reference.

TECHNICAL FIELD

The present disclosure relates to apparatus and method for frequency allocation using reinforced learning for low earth orbit satellite network. Especially, the present disclosure relates to technology allocating frequency resources efficiently to target satellite network in assumption of the environment wherein neighborhood satellite networks exist in a plurality of satellite network using a same frequency band.

RELATED ART

The statements in this section merely provide background information related to the following embodiments and may not constitute the prior art.

In a communication network, management of interference between frequency channels is an issue that is dealt with constantly.

Recently, attempts have been made to use machine learning in managing the frequency interference.

However, the machine learning is strongly limited to assumptions and conditions given for learning, and it is therefore understood that the machine learning applied to a certain communication environment is hardly applicable to the assumptions and conditions for another communication environment.

Conventional research on frequency allocation based on the machine learning has been generally conducted for the purpose of using frequency bands of other services without interference in terms of securing frequency resources for mobile communication, and it is not easy to apply such conventional research to satellite services or communication networks that use limited frequency resources.

SUMMARY

In a frequency allocation technique based on machine learning according to the related art, there was a case where reinforcement leaning was used for mitigating interference between multi cells in areas for terrestrial mobile communication services.

Such related art has been utilized for the purposed of mitigating interference between frequency resources fully identified within the same system, but is not suitable for mitigating the frequency interference with other communication networks with which system information is not exchanged.

The disclosure is to provide a method of maximizing the throughput of a desired satellite network while reducing interference with other satellite networks by predicting the frequency resources being used by other satellite networks in order to mitigate the interference with other satellite networks among a plurality of satellite networks using the same frequency band.

The disclosure is to propose a technique that maximizes the throughput of a desired satellite network while reducing interference between satellite networks independently operated without sharing information therebetween, under an environment of the plurality of satellite networks using the same frequency band.

The disclosure is to provide a technique that maximizes the throughput of a target satellite network while reducing interference with other satellite networks by introducing a criterion for limiting the use of the frequency resources in itself to mitigate the interference in addition to frequency resource allocation of a reinforcement learning model.

According to an exemplary embodiment of the present disclosure, a frequency resource allocation apparatus comprising a processor, wherein the processor is configured to: select resources for transmitting a signal to a user based on a leaning model, allocate the selected resources to the user, transmit the signal to the user using the selected resources, receive information about whether the transmission of the signal is successful or not from the user via a feedback channel after a delayed time, and update an internal parameter of the leaning model with respect to the resources used for transmitting the signal.

The processor may determine whether to transmit the signal to the user based on a collision probability of when the selected resources are used for transmitting the signal to the user.

The processor may determine not to transmit the signal to the user when the collision probability is greater than the threshold.

The processor may determine whether to transmit the signal to the user so that a probability of actually transmitting the signal to the user using the selected resources does not exceed a first threshold and a second threshold obtained based on a probability that the resources are selected.

The processor may select resources for transmitting the signal to the user independently of an adjacent satellite network using the same resources.

The learning model may comprise a reinforcement learning model, and the processor may select resources for transmitting the signal to the user based on an action derived from an output of the reinforcement learning model.

The reinforcement learning model may comprise a reinforcement learning model based on a multi-armed bandits (MAB) model, and the processor may control the reinforcement learning model by modeling the resources as an arm of the MAB model.

The reinforcement learning model may output the action based on an upper confidence bound (UCB) algorithm.

A process of updating the internal parameter in the reinforcement learning model may comprise a process of updating a state value and a reward value of the reinforcement learning model with respect to the resources used for transmitting the signal.

The internal parameter of the reinforcement learning model may comprise at least one of each accumulative index of the resources, an accumulative average reward value, and a threshold value for controlling the collision probability.

According to an exemplary embodiment of the present disclosure, a frequency resource allocation method executed by a processor of a computing system comprising the processor that electrically communicates with a learning model, the method comprising: selecting resources for transmitting a signal to a user based on the learning model;

allocating the selected resources to the user; transmitting the signal to the user using the selected resources; receiving information about whether the transmission of the signal is successful or not from the user via a feedback channel after a delayed time, and updating an internal parameter of the learning model with respect to the resources used for transmitting the signal.

The method may further comprise determining whether to transmit the signal to the user based on a collision probability of when the selected resources are used for transmitting the signal to the user.

The step of determining whether to transmit the signal to the user may comprise determining not to transmit the signal to the user when the collision probability is greater than the threshold.

The method may further comprise determining whether to transmit the signal to the user so that a probability of actually transmitting the signal to the user using the selected resources does not exceed a first threshold and a second threshold obtained based on a probability that the resources are selected.

The step of selecting the resources may comprise selecting resources for transmitting the signal to the user independently of an adjacent satellite network using the same resources.

The learning model may comprise a reinforcement learning model, and the step of selecting the resources may comprise selecting resources for transmitting the signal to the user based on an action derived from an output of the reinforcement learning model.

The reinforcement learning model may comprise a reinforcement learning model based on a multi-armed bandits (MAB) model, and the resources may be modeled as an arm of the MAB model.

The step of selecting the resources may comprise selecting resources for transmitting the signal to the user based on the action derived based on an upper confidence bound (UCB) algorithm by the reinforcement learning model.

The step of updating the internal parameter of the learning model may comprise updating a state value and a reward value of the reinforcement learning model with respect to the resources used for transmitting the signal.

The step of updating the internal parameter of the learning model may comprise updating the internal parameter comprising at least one of each accumulative index of the resources, an accumulative average reward value, and a threshold for controlling the collision probability.

BRIEF DESCRIPTION OF THE DRAWINGS

FIG. 6 is a conceptual view illustrating the frequency resource allocation process according to an embodiment of the disclosure.

FIG. 7 is a conceptual view illustrating the frequency resource allocation process according to an embodiment of the disclosure.

FIG. 8 is a conceptual view illustrating a process of updating the internal parameter of the learning model according to an embodiment of the disclosure.

DETAILED DESCRIPTION

Figure 1:
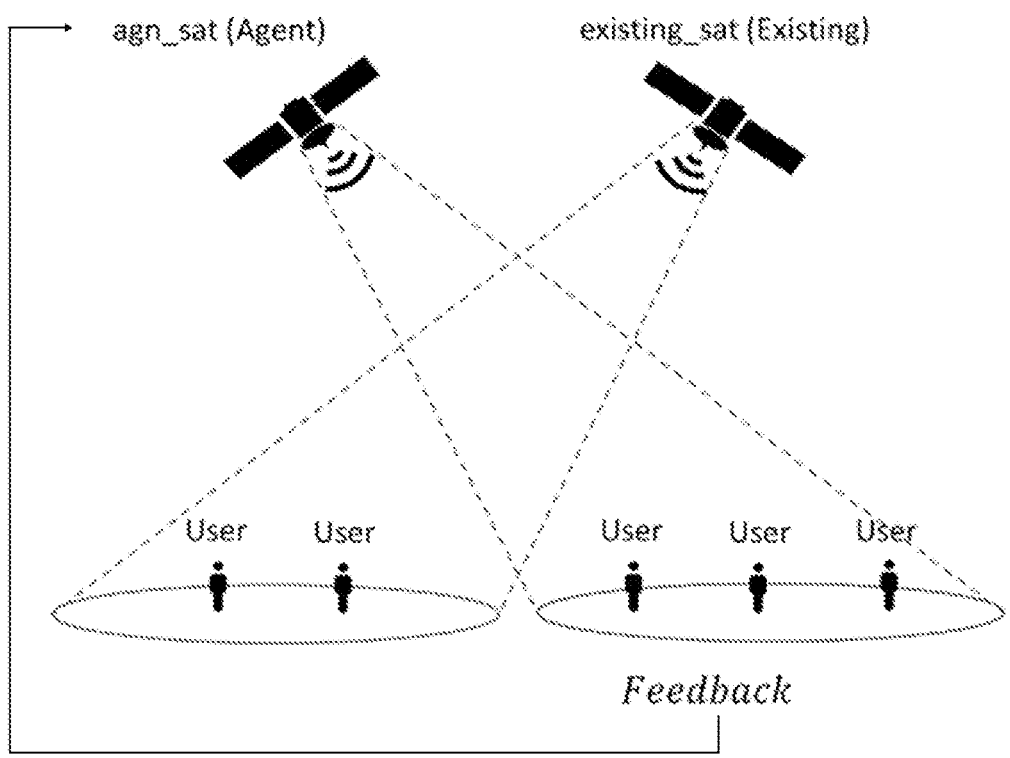
FIG. 1 is a conceptual view showing a satellite network system in which a frequency resource allocation apparatus operates according to an embodiment of the disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Since too much detailed description of the related arts may obscure the ideas of the present invention, the detailed explanation of the related art can be omitted. The skilled person can recognize the differentiated feature of the present invention from the related arts, for example, implementing a reinforced learning model using MAB (Multi-Arm Bandit) model, utilizing an UCB (Upper Confidence Bound) model for the reinforced learning model.

The matters disclosed in the related arts can be included as a at least a part of the present invention within the scope consistent with the purpose of the present invention.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual view showing a satellite network system in which a frequency resource allocation apparatus operates according to an embodiment of the disclosure.

The disclosure relates to a reinforcement learning algorithm-based method of frequency allocation from a low Earth orbit satellite network using the same frequency band to another low Earth orbit satellite network in order to mitigate frequency interference In particular, the disclosure relates to reinforcement learning-based technology for allocating frequency resources to maximize transmission performance while alleviating the effect of frequency interference from a downlink of a plurality of low Earth orbit satellite networks using the same frequency band toward other satellite networks.

FIG. 1 illustrates a scenario in which the same frequency band is shared between an existing satellite network operated by an existing (adjacent) satellite noted by 'existing_sat' and a target satellite network (agent satellite network) operated by a target satellite (agent satellite) noted by 'agn_sat'.

Users of each satellite network belong to a main lobe of a transmission beam from the corresponding satellite, and at the same time are subjected to interference due to side lobes of transmission beams from other satellites. The target satellite agn_sat may predict frequency resources being used by the existing satellite existing_sat based on a kind of machine leaning technique, i.e., reinforcement learning, and allocate resources to reduce signal interference between the target satellite agn_sat and the existing satellite existing_sat.

In this case, the target satellite agn_sat and the existing satellite existing_sat are independent of each other in allocating the frequency resources to the users of the satellite networks and transmitting signals to the users. In other words, the target satellite agn_sat and the existing satellite existing_sat do not share information about the frequency resources being used by them, and therefore a reinforcement learning model may be designed to predict the frequency resources being used by the counterpart satellite.

A user may receive a signal from the satellite and then provide feedback information about whether the signal is properly received from the satellite via a separate feedback channel. In this case, the separate feedback channel may be implemented by the related art. The separate feedback channel may be implemented in such a way that the users respectively transmit the feedback information toward the satellites after certain periods of time, or in such a way that the users send the feedback information to a specific repeater and the feedback information gathered by the repeater is transmitted to the satellites. Here, the transmission of the feedback information via the feedback channel is carried out after a predetermined time has elapsed from time when the signal is transmitted from the satellite to the user.

Figure 2:
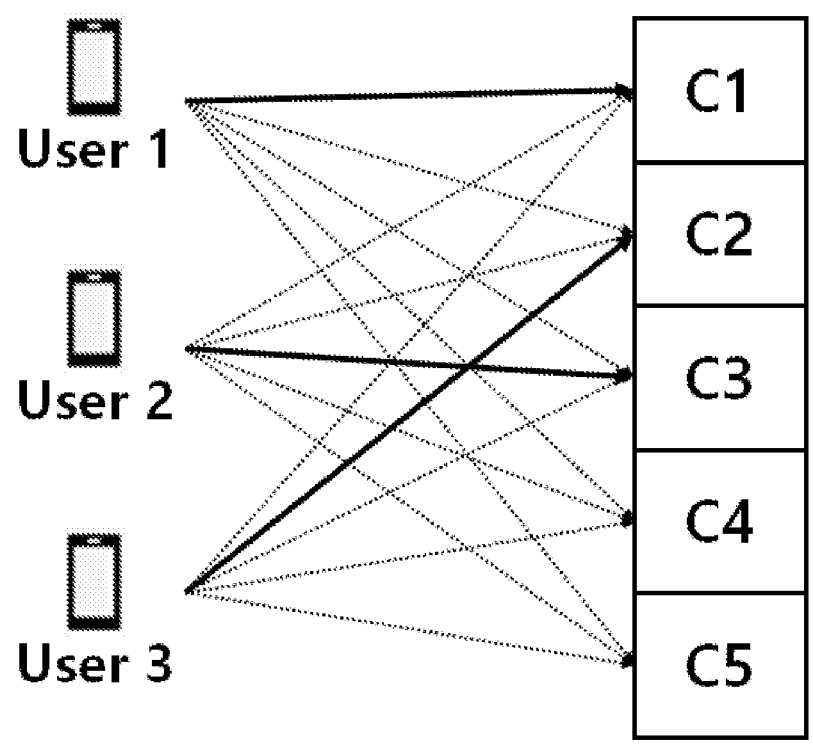
FIG. 2 is a conceptual view showing an example that the frequency resources are allocated by the frequency resource allocation apparatus according to an embodiment of the disclosure.

FIG. 2 is a conceptual view showing an example that the frequency resources are allocated by the frequency resource allocation apparatus according to an embodiment of the disclosure.

FIG. 2 illustrates an embodiment in which the satellite has N exclusive frequency resources and transmits a signal by allocating K frequency resources to a user who receives a service.

In the embodiment shown in FIGS. 2, N=5, and K=1. In other words, one resource may be allocated to each user. Each satellite manages a total of five frequency resources.

Referring to FIG. 2, a resource C1 is allocated to a user 1, a resource C3 is allocated to a user 2, and a resource C3 is allocated to a user 3.

Figure 3:
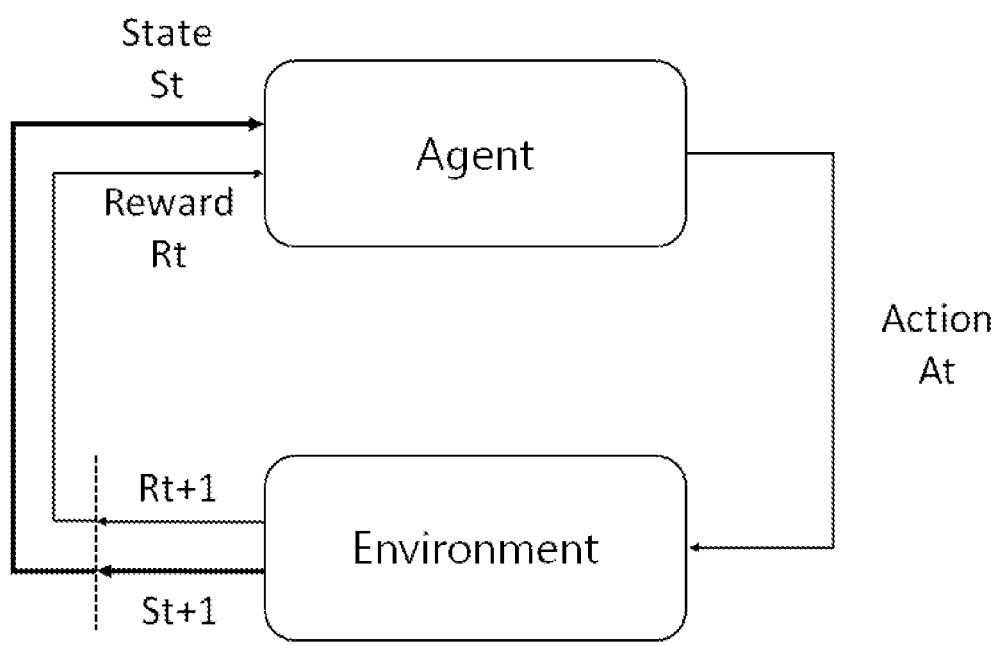
FIG. 3 is a conceptual view showing a reinforcement learning model used in a learning model of the frequency resource allocation apparatus according to an embodiment of the disclosure.

FIG. 3 is a conceptual view showing a reinforcement learning model used in a learning model of the frequency resource allocation apparatus according to an embodiment of the disclosure.

Each satellite may include the frequency resource allocation apparatus or may be associated with the frequency resource allocation apparatus. The concept of the reinforcement learning model provided in the frequency resource allocation apparatus is illustrated in FIG. 3.

In general, the reinforcement learning refers to learning what action At is the best to take in the current state St. A reward Rt is given from an external environment whenever the action At is taken, and the learning may be performed to maximize the reward Rt.

The reward may not be given immediately after the action is taken (i.e., a delayed reward). For this reason, the reinforcement learning has the level of difficulty much higher than that of supervised learning/unsupervised learning, and a credit assignment problem about a proper reward for the system has been studied as a problem to be solved in the reinforcement learning.

As a general example, it may be assumed that artificial intelligence plays a game such as chess. The arrangement of chess pieces a current player and an opponent have may be regarded as the state, and which chess piece to move to where may be regarded as the action. The reward may be given when the opponent's chess piece is captured. At this time, the opponent's chess piece and the player's chess piece may be so far apart that the time when the player's chess piece moves to and captures the opponent's chess piece may be after a considerable amount of time has elapsed from the time when the action pf moving the chess pieces is taken.

Further, the reward may not be appropriate when it is optimized considering that the chess pieces are captured one by one. Although the action of capturing each individual chess piece is advantageous right now, it may return to disadvantage when a victory or defeat is finally determined. The reward in which such complex conditions is considered may be regarded as the delayed reward.

Therefore, it is crucial for the reinforcement learning to implement a model in which the action is selected so that the sum of reward values including values to be obtained later can be maximized even though the immediate reward value is slightly low.

Referring back to FIG. 3, the agent may select the action At based on the state St and the reward Rt with respect to the current point of time t. Considering the effect of the action At on the environment, the state St+1 and the reward Rt+1 in the next time t+1 may be determined.

The agent may be implemented to optimize the final reward from a long-term perspective. With more complex problems, a parameter to be optimized may not match the reward. For the parameter to be optimized, a reward algorithm of the reinforcement learning may be appropriately designed.

Recently, many researches have been conducted to apply the machine learning to the management of the frequency interference. In particular, the reinforcement learning technique has been used to mitigate the interference between multiple cells in a terrestrial mobile communication service area, and research has been proposed to utilize the reinforcement learning technology for optimizing frequency resource allocation between cells of a low Earth orbit satellite system even in the field of satellites.

However, the existing application cases have employed the machine learning technique to many pieces of system information for the purpose of mitigating the interference within the same system (in which information about the resource allocation is shared), and it is difficult to use the machine learning technique to mitigate the frequency interference with other/existing satellite networks with which the system information is not shared.

When the same frequency band is shared among terrestrially movable, stationary, movable satellite, stationary satellite and the like heterogeneous services, a separation distance or power transmission is needed to be regulated to minimize the interference with other networks. However, such techniques have shortcomings that resource utilization is lowered because the use of the frequency resources are limited. To overcome such shortcomings, it is required to develop the frequency allocation technology for maximizing the resource utilization while mitigating the frequency interference between heterogeneous communication services.

Currently, research on frequency allocation for heterogeneous services based on the machine learning is being conducted for the purpose of using the frequency bands of other services without interference in terms of mainly securing the frequency for mobile communication. On the other hand, the related art has not reached the development of technology for mitigating the interference with other satellite networks in the field of satellite services. The disclosure is to propose a reinforcement learning model for mitigating the interference with other satellite networks in the field of satellite services, and propose a more effective frequency resource allocation technique by adding constraint conditions for mitigating the interference with other satellite networks while using a reinforcement leaning model.

A frequency resource allocation method according to an embodiment of the disclosure may be a frequency resource allocation method performed by a processor of a computing system including the processor that electrically communicates with a learning model. The frequency resource allocation method according to an embodiment of the disclosure includes the steps of selecting resources for transmitting a signal to a user based on the learning model; allocating the selected resources to the user; transmitting the signal to the user through the selected resources; receiving feedback on whether the signal is successfully transmitted or not from the user via a feedback channel after a delayed time; and updating internal parameters of the learning model with respect to the resources used for transmitting the signal.

Figure 4:
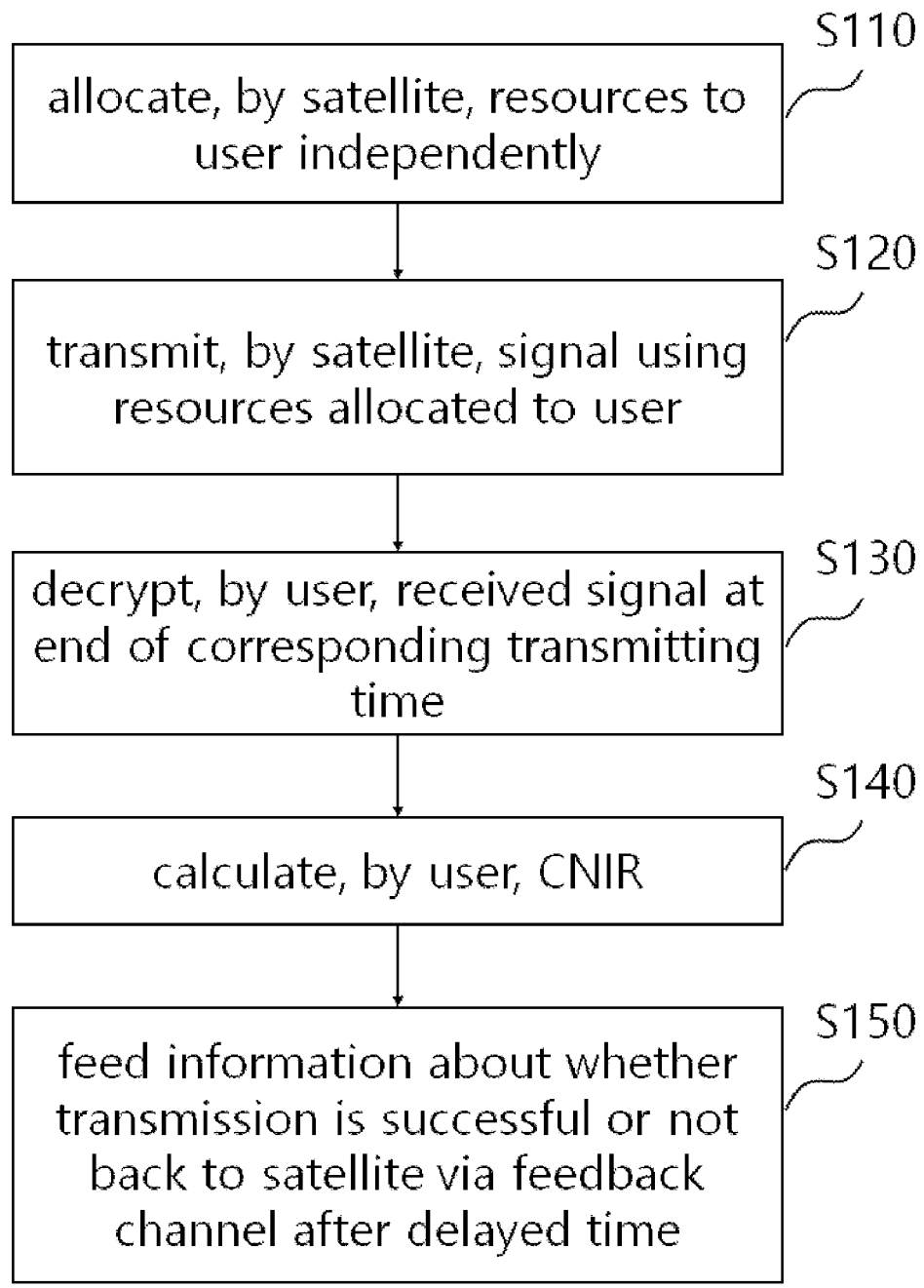
FIG. 4 is a flowchart of the frequency resource allocation method according to an embodiment of the disclosure.

FIG. 4 is a flowchart of the frequency resource allocation method according to an embodiment of the disclosure.

The frequency resource allocation method according to an embodiment of the disclosure may be performed by the processor that executes at least one instruction stored in a memory.

A frequency resource allocation process of satellites according to an embodiment of the disclosure may be described assuming a discrete-time system for convenience of description.

However, according to an alternative embodiment of the disclosure, the frequency resource allocation process may also be applicable to a continuous-time system, and it will be apparent to those skilled in the art that a frequency resource allocation technique is implemented for the continuous-time system based on the disclosure in this specification.

Referring to FIG. 4, the frequency resource allocation process of the satellites according to an embodiment of the disclosure may include the following processes with respect to every unit transmission time t under the discrete-time system.

The satellites or frequency resource allocation apparatuses may allocate the resources for transmitting data to users independently of one another (S110).

Each satellite or frequency resource allocation apparatus may transmit a signal to the user through the resources allocated to the user (S120).

Each user may decrypt the received signal at the end of the corresponding transmission time t (S130).

Each user may calculate a carrier-to-noise and interference ratio (CNIR) (S140). In this case, the transmission is considered to be successful when the CNIR is greater than or equal to a threshold value, but considered to be failed due to the interference with other satellite network when the CNIR is lower than the threshold.

The success or failure of the transmission may be fed back to the satellite via the separate feedback channel after a fixed delayed time (S150). The satellite may receive feedback information from the user after a certain delayed time has elapsed after transmitting the signal. The frequency resource allocation apparatus may also receive the feedback information from the user after a certain delayed time has elapsed from after the satellite transmits the signal.

Figure 5:
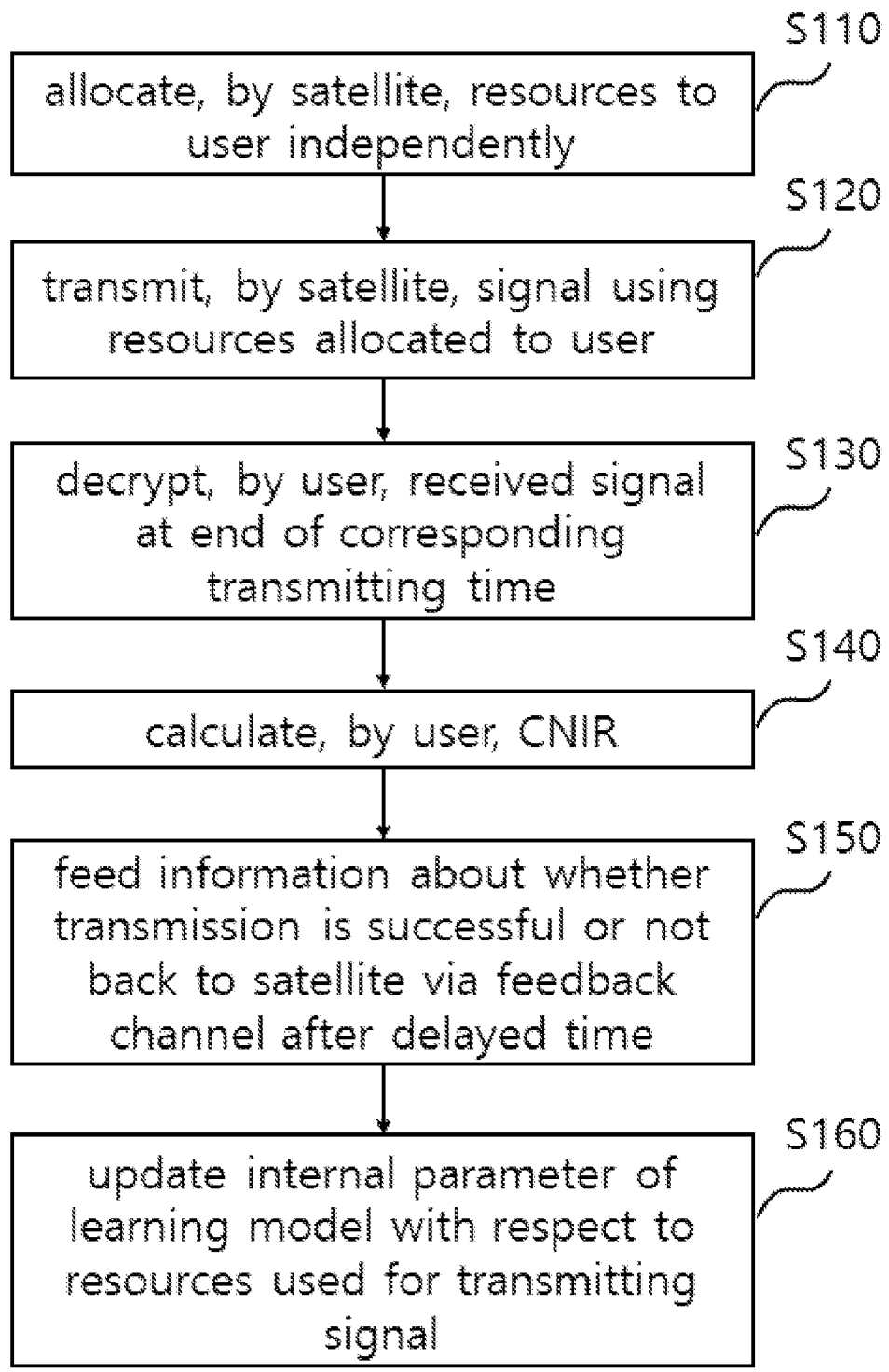
FIG. 5 is a flowchart of the frequency resource allocation method according to an embodiment of the disclosure.

FIG. 5 is a flowchart of the frequency resource allocation method according to an embodiment of the disclosure.

The frequency resource allocation method according to an embodiment of the disclosure may be performed by the processor that executes at least one instruction stored in the memory.

The satellite or the frequency resource allocation apparatus may update the internal parameter of the learning model with respect to the resources used for transmitting the signal, based on whether the transmission of the signal is successful or failed, after steps S110 to S150 are performed (S160).

The process of updating the internal parameter of the learning model will be described later with reference to FIG. 8.

The learning model may be based on the reinforcement learning model. In the step of selecting the resources, the resources to be used for transmitting the signal to the user may be selected based on the action derived from the output of the reinforcement learning model.

The reinforcement learning model may include a reinforcement learning model based on multi-armed bandits (MAB) model. In this case, the resources may be modeled as the arm of the MAB.

In the step of selecting the resources, the resources to be used for transmitting the signal to the user may be selected based on the action derived by an upper confidence bound (UCB) algorithm of the reinforcement learning model.

In the step of updating the internal parameter of the learning model, a state value and a reward value of the reinforcement learning model may be updated with respect to the resources used for transmitting the signal.

In the step of updating the internal parameter of the learning model, the internal parameters including at least one of each accumulative index of the resources, an accumulative average reward value, and a threshold value for controlling collision probability may be updated.

FIG. 6 is a conceptual view illustrating the frequency resource allocation process according to an embodiment of the disclosure.

Referring to FIG. 6, the target satellite agn_sat and the existing satellite existing_sat are used to allocate the frequency resources to the users, and the process of determining whether the transmission of the signal is successful or not based on a CNIR value is simulated.

In this case, by the 'Allocate_AgentRB' procedure, the frequency resources are allocated from the target satellite agn_sat to the user, and the feedback information based on this allocation will be described later with reference to FIG. 7.

The CNIR value is calculated for the signal received by the user, and the target satellite agn_sat may receive the feedback information including the CNIR value after a "delay" of a certain time is delayed.

The process of calculating the CNIR value for the signal received by the user will be described with reference to the 'user.receive' procedure in a lower part of FIG. 6.

FIG. 7 is a conceptual view illustrating the frequency resource allocation process according to an embodiment of the disclosure.

Referring to FIG. 7, a detailed process of the 'Allocate_AgentRB' procedure is shown as a part of the process in FIG. 6.

According to an embodiment of the disclosure, a resource allocation problem of the satellites is modeled as one of the machine learning problems, e.g., a MAB problem.

In this case, the reinforcement learning model according to an embodiment may be implemented to use the UCB algorithm as an algorithm for determining the action.

To implement the frequency resource allocation technique based on the MAB modeling and the UCB algorithm, the performance indexes of the MAB modeling and UCB algorithm may be assumed as follows.

The MAB problem of obtaining a reward r by selecting one of N channels every time will be taken into account. In this case, which channel selected among N channels to transmit a signal may correspond to which arm to operate in the MAB model.

Let the arm selected at time t be a(t), and the reward value obtained at time t be r(t). When the average $\mu_i$ of the reward values obtained when the $i^{th}$ arm $a_i$ is selected may be expressed by the following Equation 1.

$$\mu_i = E[R(t)|a(t)=a_i] \quad \text{[Equation 1]}$$

Let an average value of rewards obtainable when the optimal arm $\alpha^*$ is selected be $\mu^*$ The average value of the rewards may be expressed by the following Equation 2.

$$\mu^* = \max_i \mu_i \quad \text{[Equation 2]}$$

Let the difference between the sum of average rewards obtained when the optimal policy is selected at time T and the sum of average rewards obtained when the current policy is selected be $R_T$. The $R_T$ may be expressed by the following Equation 3.

$$R_T = T*\mu^* - E\left[\sum_{t=1}^{T} r(t)\right] \quad \text{[Equation 3]}$$

The UCB algorithm will be taken into account to select the arm a that meets the condition of the following expression 4 with respect to every unit time t.

$$a = \operatorname{argmax}_i\left(\hat{\mu}_i(t-1) + \sqrt{\frac{2\log(1 + t \cdot \log^2 t)}{\tau_i(t-1)}}\right) \quad \text{[Equation 4]}$$

In, the Equation 4, $\hat{\mu}_i(t)$ is an average reward value obtained from the $i^{th}$ arm until the time t, and $\tau_i(t)$ is the total number of times the $i^{th}$ arm selected until the time t.

When the algorithm is iterated, the regret bound of the $R_T$ may be expressed by the following Equation 5.

$$R_T \leq C \cdot \frac{2N}{\Delta} \cdot \log T \quad \text{[Equation 5]}$$

where, C is a constant, and may be given as $$\Delta = \min_{i \neq a^*}|\mu_i - \mu^*|.$$

The maximum performance (or the minimum regret) an arbitrary arm selection algorithm can achieve is called a minimax lower bound and known as shown in the following Equation 6.

$$\lim_{T \to \infty} \frac{R_T}{\log T} \geq C' \quad \text{[Equation 6]}$$

where, C' is a constant. Based on comparison between the Equation 5 and the Equation 6, it is understood that the optimal performance is achieved by the UCB algorithm when the frequency resource allocation is subjected to the MAB modeling.

Referring back to FIG. 7, when N frequency resources are given, N+1 arms may be assumed by considering no signal transmission (no transmit). In other words, i may be a natural number from 1 to N+1.

In FIG. 7, i, at which the UCB(i) is maximized, may be determined based on the Equation 4. In this case, the selection of the arm may be a temporary decision based only on the UCB index Referring to the lower part of FIG. 7, a process of allocating the frequency block is illustrated. This process may be an actual decision made considering a frequency collision limit.

In the process shown in the lower part of FIG. 7, the interference with the satellite network of the existing satellite existing_sat is limited, thereby satisfying an interference condition for the satellite network of the existing satellite existing_sat.

Let a probability of transmitting data through a frequency block i in the satellite network of the existing satellite existing_sat be $P_i^E$, and a probability that a frequency block selected as the UCB index in the satellite network of the target satellite agn_sat without considering the interference probability control condition is the frequency block i be $P_i^A$.

When the satellite network of the target satellite agn_sat selects the frequency block i based only on the UCB index (without considering the frequency interference condition), let a probability of actually transmitting data through the block i be $P_i^{Aexecute}$.

Let a probability that the satellite network of the target satellite agn_sat based on the frequency resource allocation technique according to an embodiment of the disclosure selects the block i based on the UCB index to transmit data be $P_i^{Atrans}$. Then, the probability $P_i^{Atrans}$ may be expressed by the following Equation 7.

$$P_i^{Atrans} = P_i^A * P_i^{Aexecute} \quad \text{[Equation 7]}$$

Let a probability that interference (collision) occurs when the satellite network of the existing satellite existing_sat transmits data through the block i be $P_i^{Ecollision}$, the collision probability $P_i^{Ecollision}$ may be expressed by the following Equation 8.

$$P_i^{Ecollision} = \frac{P_i^{Atrans} * P_i^E}{P_i^E} = P_i^{Atrans} \quad \text{[Equation 8]}$$

To control the probability of interference with the block i of the satellite network of the existing satellite existing_sat by a first threshold $\overline{C}_i$, a constraint condition given by the following Equation 9 may be used.

$$P_i^{Ecollision} \leq \overline{c}_i \quad \text{[Equation 9]}$$

By combining the Equations 7 to 9, the Equation 9 may be expressed by the following Equation 10.

$$P_i^{Ecollision} = P_i^{Atrans} = P_i^A * P_i^{Aexecute} \leq \overline{c}_i \quad \text{[Equation 10]}$$

It is known that the probability $P_i^A$ that the block i is selected converges to a specific value when T→∞. Therefore, the algorithm proposed according to an embodiment of the disclosure controls the satellite network of the target satellite agn_sat to have the transmission probability $P_i^{Aexecute}$ not to be greater than a second threshold $\overline{c}_i / P_i^A$, thereby indirectly controlling the probability of interference with the satellite network of the existing satellite existing_sat. Such a process may be expressed by the following Equation 11.

$$P_i^{Aexecute} \leq \overline{c}_i / P_i^A \quad \text{[Equation 11]}$$

In the algorithm proposed according to an embodiment of the disclosure, the satellite network of the target satellite agn_sat or the frequency resource allocation apparatus determines whether to transmit data based on the first threshold or the second threshold, thereby adjusting the transmission probability $P_i^{Aexecute}$.

For example, it is assumed that the transmission probability $P_i^{Aexecute}$ calculated at time t is expressed as $P_i^{Aexecute}(t)$, and the block i is selected based on the UCB index.

When the satellite network of the target satellite agn_sat or the frequency resource allocation apparatus does not actually transmit data using the allocated resources, the transmission probability $P_i^{Aexecute}$ satisfies the following Equation 12 at the next time t+1.

$$P_i^{Aexecute}(t+1) \leq P_i^{Aexecute}(t) \quad \text{[Equation 12]}$$

Based on the Equation 11 and the Equation 12, the satellite network of the target satellite agn_sat or the frequency resource allocation apparatus according to an embodiment of the disclosure controls data transmission to satisfy the Equation 11 while tracking the frequency selection probability $P_i^A$ and the transmission probability $P_i^{Aexecute}$, thereby indirectly controlling the probability of interference with the satellite network of the existing satellite existing_sat.

As described above, the frequency resource allocation method according to an embodiment of the disclosure may further include the step of determining whether to transmit the signal to the user based on the collision probability of when the selected resources are used to transmit the signal to the user.

As described above, the step of determining whether to transmit the signal to the user may include determining not to transmit the signal to the user when the collision probability is greater than the threshold.

As described above, the frequency resource allocation method according to an embodiment of the disclosure may further include the step of determining whether to transmit the signal to the user so that the probability of actually transmitting the signal to the user through the selected resources is not greater than the first threshold and the second threshold obtained based on the probability that the resources are selected.

With the frequency resource allocation technique according to an embodiment of the disclosure, it will be assumed that the target satellite agn_sat is used by K users (where, K=1) and shares N frequency resources blocks (where, N=5) with the satellite network of the existing satellite existing_sat.

The existing satellite existing_sat may allocate the frequency resources with an arbitrarily constant probability every unit time, and the probability value may be set differently according to the frequency resources blocks. In this case, it will be assumed that the probability value is not known to the target satellite agn_sat.

When the probability value P for each frequency resource block is given as P[0.2, 0.3, 0.3, 0.3, 0.3], the first frequency block may be allocated as the resources to the user with a probability of 0.2, but the other blocks may be allocated as the resources to the user with a probability of 0.3.

For example, with respect to five frequency resource blocks, let the allocated block have a state of "1" and the unallocated block have a state of "0." Then, a state vector at time t may be expressed by the following Equation 13.

$$E(t) = [e_1^t, e_2^t, e_3^t, e_4^t, e_5^t] = [0,1,1,0,0] \quad \text{[Equation 13]}$$

The target satellite agn_sat or the frequency resource allocation apparatus according to an embodiment of the disclosure may allocate the frequency resources block based on the algorithm shown in FIG. 7. When even an option that the target satellite agn_sat transmits no signal is taken into account, the MAB model having a total of N+1 arms is considered. In this case, E(t) refers to a vector that expresses the allocated or unallocated states of N frequency blocks.

An accumulative number of allocations for each block during the first N+1 time is given as $\tau_i=0$, and it is therefore assumed that each arm is alternately selected one by one.

It is assumed that a state variable the target satellite agn_sat has at an arbitrary time t=100>(N+1) is given by the following Equation 14.

$\tau(t)=[15,18,32,15,5,2]$(accumulative number of selection times)

$\hat{\mu}(t)=[0.3,0.4,0.5,0.4,0.3,0]$(average reward)

$P^{A\_execute}=[0.1,0.17,0.11,0.1,0.7,0]$(transmission probability)

$P^A=[0.09,0.2,0.4,0.2,0.09,0.02]$(selection probability)

$\bar{c}=[0.1,0.2,0.2,0.1,0.5,0]$(collision rate limit/first threshold) [Equation 14]

In the state given as shown in the Equation 14, the frequency resources i having the highest index may be selected. For example, the third frequency block may be selected.

In this case, a temporary selection status for each frequency resource may be given as shown in the following Equation 15.

$\tilde{U}(t)=[\tilde{u}_1^t,\tilde{u}_2^t,\tilde{u}_3^t,\tilde{u}_4^t,\tilde{u}_5^t,\tilde{u}_6^t]=[0,0,1,0,0,0]$ Equation [15]

$\tilde{U}(t)$ is a state vector that represents whether (N+1) arms are temporarily selected or not at time t, and $\tilde{u}_i^T$ is a variable that represents whether the arm i is temporarily selected or not at time T by "1" or "0".

According to this embodiment, a currently temporarily selected frequency resource has a transmission probability of '0.11,' and may be compared with a given second threshold. The second threshold may be represented by the following Equation 16.

$\bar{c}_3/P_3^A=0.2/0.4=0.5$ [Equation 16]

A temporarily selected third block (i=3) has a transmission probability of '0.11', which is lower than the second threshold, and therefore the resources are actually allocated to the third block to transmit a signal.

At this time, the state vector U(t) that represents the actually used arm among N+1 arms may be expressed by the following Equation 17

$U(t)=[u_1^t,u_2^t,u_3^t,u_4^t,u_5^t,u_6^t]=[0,0,1,0,0,0]$ [Equation 17]

$u_i^T$ is a variable that represents whether the arm i is actually allocated/used or not at time T by "1" or "0".

In the foregoing embodiment, the transmission probability is lower than the second threshold and the allocation is actually made to transmit the signal. However, according to an alternative embodiment, the signal may not be actually transmitted when the transmission probability is greater than the second threshold. In this case, the state vector U(t) may be expressed by the following Equation 18.

$U(t)=[0,0,0,0,0,1]$ [Equation 18]

In this case, the last element of U(t) may have a state value corresponding to the sixth arm—when the signal is not actually transmitted.

Each satellite network may use the frequency block indicated by E(t) and U(t) to transmit a signal to a user.

Each user may receive data by decoding the received signal.

When the CNIR is greater than or equal to the threshold, the signal is considered to be normally received and given a value of reward=1.

When the CNIR is lower than the threshold, the signal is considered to be not normally received and given a value of reward=0.

The reward values of users of the satellite network of the target satellite agn_sat may be fed back to the target satellite agn_sat via the feedback channel after a certain delayed time.

FIG. 8 is a conceptual view illustrating a process of updating the internal parameter of the learning model according to an embodiment of the disclosure.

The reinforcement learning model of the frequency resource allocation apparatus according to an embodiment of the disclosure may update the transmission probability $P_i^{A execute}$ and the selection probability $P_i^A$ of the frequency resources i as the internal parameters.

The transmission probability $P_i^{A execute}$ may be updated based on a ratio between the actual number of transmissions using the resource block and the number of times the resource block has been selected until the current time t. In this case, the ratio may be based on the following Equation 19.

$\Sigma_{T=0}^t u_i^T / \Sigma_{T=0}^t \tilde{u}_i^T$ [Equation 19]

The selection probability $P_i^A$ may be updated based on the number of times the resource block has been selected until the current time t.

The reinforcement learning model of the frequency resource allocation apparatus according to an embodiment of the disclosure may update the internal parameter for obtaining the UCB value with respect to the resource block actually used in transmitting the signal.

In the foregoing embodiment, when i=3, $u_3^t=1$. Therefore, $\tau_3$ may be updated as shown in the following Equation 20.

$\tau_3(t+1)=\tau_3(t)+1$ [Equation 20]

In addition, the accumulative reward $\hat{\mu}_3$ for the third block may be updated as sown in the following Equation 21.

$$\hat{\mu}_3(t+1) = \hat{\mu}_3(t)\left(1 - \frac{1}{\tau_3(t)}\right) + \frac{\text{reward (0 or 1)}}{\tau_3(t)}$$ [Equation 21]

In the process of the frequency resource allocation apparatus according to an embodiment of the disclosure, one sequence is terminated when the resource block actually used for transmitting the signal is completely updated.

According to the embodiments of FIGS. 4 to 8, the disclosure can make the maximum use of the frequency of the desired satellite network among the plurality of satellite networks using the same frequency band.

According to the embodiments of FIGS. 4 to 8, the disclosure can satisfy an interference constraint condition required by the counterpart satellite network, in terms of using the frequency of a desired satellite network among the plurality of satellite networks using the same frequency band.

According to the embodiments of FIGS. 4 to 8, the disclosure satisfies requirements for interference with the counterpart system and enables effective signal transmission while making the maximum use of the frequency resources based on the reinforcement learning techniques performed independently of each other even when any information is not shared between different systems. In this case, it is assumed that the same frequency band is shared between the different systems.

According to the embodiments of FIGS. 4 to 8, the disclosure satisfies requirements for interference with the counterpart system and allows effective signal transmission while making the maximum use of the frequency resources based on the reinforcement learning techniques performed independently of each other without requiring any assumption about the operation mechanism of the counterpart system even when any information is not shared between different systems.

Figure 9:
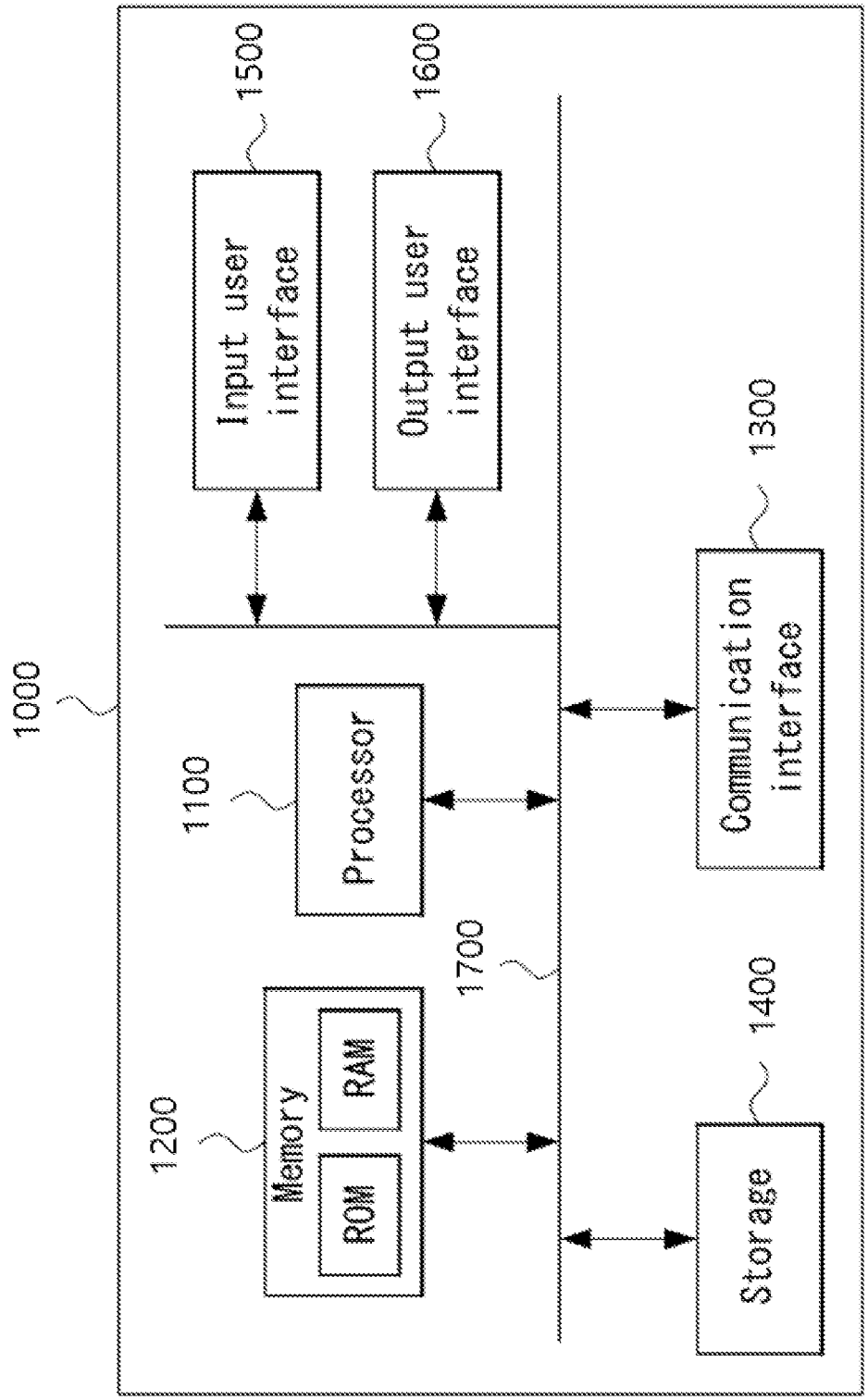
FIG. 9 is a block diagram showing a generalized configuration of a frequency allocation apparatus, and a computing system according to an embodiment of the present invention, capable of performing at least of processes disclosed in embodiments of FIGS. 1 through 8.

FIG. 9 is a block diagram showing a generalized configuration of a frequency allocation apparatus, and a computing system according to an embodiment of the present invention, capable of performing at least of processes disclosed in embodiments of FIGS. 1 through 8.

According to embodiments disclosed in FIGS. 1-8, respective entities can be electronically connected to process and memories, and controlled/managed by the processor.

At least a part of the frequency allocation method according to an embodiment of the present invention may be executed by the computing system 1000 of FIG. 9.

Referring to FIG. 9, the computing system 1000 according to an embodiment of the present invention may include a processor 1100, a memory 1200, a communication interface 1300, a storage device 1400, an input interface 1500, and an output interface 1600 and a system bus 1700.

The computing system 1000 according to an embodiment of the present invention may include at least one processor 1100 and a memory 1200 stores instructions for invoking the at least one processor 1100 to perform at least one step of the method according to an embodiment of the present invention The at least one step of the method may be performed by the at least one processor 1100 loading and executing instructions from the memory 1200.

The processor 1100 may imply a central processing unit (CPU), a graphics processing unit (GPU), or a dedicated processor on which methods according to embodiments of the present invention can be performed.

Each of the memory 1200 and the storage device 1400 may be configured as at least one of a volatile storage medium and a non-volatile storage medium. For example, the memory 1200 may be configured as at least one of a read only memory (ROM) and a random access memory (RAM).

The computing system 1000 may include a communication interface 1300 for performing communication through a wireless network.

The computing system 1000 may further include a storage device 1400, an input interface 1500, an output interface 1600, and the like.

In addition, each component included in the computing system 1000 may be connected by a bus 1700 to communicate with each other.

For example, a computer system 1000 can be implemented as at least one of a communicable desktop computer, a laptop computer, a notebook, a smart phone, a tablet PC, a mobile phone, mobile phone, smart watch, smart glass, e-book reader, PMP (portable multimedia player), portable game console, navigation device, digital camera, DMB (digital multimedia broadcasting) player, digital audio recorder, digital audio player, digital video recorder, digital video player, PDA (Personal Digital Assistant), etc.

According to an embodiment of the disclosure, the use of frequency resources from the desired satellite is controlled based on a prediction of frequency resources being used by other satellite networks among a plurality of satellite networks using the same frequency band, thereby mitigating interference with other satellite networks.

According to an embodiment of the disclosure, the interference with other satellite networks is mitigated to minimize the required separation distance between the service areas of the satellite networks, thereby having the advantages of making the maximum use of frequencies of the desired satellite network.

According to an embodiment of the disclosure, the embodiment may maximize the throughput of a desired satellite network while reducing interference with other satellite networks by predicting the frequency resources being used by other satellite networks in order to mitigate the interference with other satellite networks among a plurality of satellite networks using the same frequency band.

According to an embodiment of the disclosure, the embodiment may maximize the throughput of a desired satellite network while reducing interference between satellite networks independently operated without sharing information therebetween, under an environment of the plurality of satellite networks using the same frequency band.

According to an embodiment of the disclosure, the embodiment may maximize the throughput of a target satellite network while reducing interference with other satellite networks by introducing a criterion for limiting the use of the frequency resources in itself to mitigate the interference in addition to frequency resource allocation of a reinforcement learning model.

The method according to an embodiment of the present disclosure may be implemented as a computer-readable program or code on computer-readable recording media. Computer-readable recording media include all types of recording devices in which data readable by a computer system are stored. The computer-readable recording media may also be distributed in a network-connected computer system to store and execute computer-readable programs or codes in a distributed manner.

The computer-readable recording medium may also include a hardware device specially configured to store and execute program instructions, such as a read only memory (ROM), a random access memory (RAM), and a flash memory. The program instructions may include not only machine language codes such as those generated by a compiler, but also high-level language codes that executable by a computer using an interpreter or the like.

Although some aspects of the present disclosure have been described in the context of an apparatus, it may also represent a description according to a corresponding method, wherein a block or apparatus corresponds to a method step or feature of a method step. Similarly, aspects described in the context of a method may also represent a corresponding block or item or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

In embodiments, a programmable logic device, e.g., a field programmable gate array, may be used to perform some or all of the functions of the methods described herein. In embodiments, the field programmable gate array may operate in conjunction with a microprocessor to perform one of the methods described herein. In general, the methods are preferably performed by a certain hardware device.

Although described above with reference to the preferred embodiments of the present disclosure, it should be understood that those skilled in the art can variously modify and change the present disclosure within the scope without departing from the spirit and scope of the present disclosure as set forth in the claims below.

What is claimed is:

1. A frequency resource allocation apparatus comprising
   a processor, and
   a reinforcement learning model trained based on a reinforcement learning technique with a modeling for resources allocation process to determine resources to be allocated for transmitting a signal to a user within a target satellite network,
   wherein the processor is configured to:
   control the reinforcement learning model to output an action;
   select resources for transmitting the signal to the user based on the action output by the reinforcement learning model,
   allocate the selected resources to the user,
   determine whether to transmit the signal to the user, before transmitting the signal to the user, based on a collision probability of when the selected resources are used for transmitting the signal to the user so that a probability of actually transmitting the signal to the user using the selected resources does not exceed a first threshold and a second threshold obtained based on a probability that the resources are selected, wherein the collision probability is a probability of collision between the target satellite network and an adjacent existing satellite network operated independently of the target satellite network and utilizing identical resources to the target satellite network,
   transmit the signal to the user using the selected resources, when it is determined to transmit the signal to the user,
   receive information about whether the transmission of the signal is successful or not from the user via a feedback channel after a delayed time, and
   update an internal parameter of the reinforcement learning model with respect to the resources used for transmitting the signal.

2. The apparatus of claim 1, wherein the processor determines not to transmit the signal to the user when the collision probability is greater than the first threshold.

3. The apparatus of claim 1, wherein the processor is configured to select resources for transmitting the signal to the user independently of the adjacent existing satellite network using the same resources.

4. The apparatus of claim 1, wherein
   the reinforcement learning model comprises a reinforcement learning model based on a multi-armed bandits (MAB) model, and
   the processor is configured to control the reinforcement learning model by modeling the resources as an arm of the MAB model.

5. The apparatus of claim 1, wherein
   the reinforcement learning model outputs the action based on an upper confidence bound (UCB) algorithm.

6. The apparatus of claim 1, wherein a process of updating the internal parameter in the reinforcement learning model comprises a process of updating a state value and a reward value of the reinforcement learning model with respect to the resources used for transmitting the signal.

7. The apparatus of claim 1, wherein the internal parameter of the reinforcement learning model comprises at least one of each accumulative index of the resources, an accumulative average reward value, and a threshold value for controlling the collision probability.

8. A frequency resource allocation method executed by a processor of a computing system comprising the processor that electrically communicates with a reinforcement learning model trained based on a reinforcement learning technique with a modeling for resources allocation process to determine resources to be allocated for transmitting a signal to a user within a target satellite network, the method comprising:
   controlling the reinforcement learning model to output an action;
   selecting resources for transmitting the signal to the user based on the action output by the reinforcement learning model;
   allocating the selected resources to the user;
   determining whether to transmit the signal to the user, before transmitting the signal to the user, based on a collision probability of when the selected resources are used for transmitting the signal to the user so that a probability of actually transmitting the signal to the user using the selected resources does not exceed a first threshold and a second threshold obtained based on a probability that the resources are selected, wherein the collision probability is a probability of collision between the target satellite network and an adjacent existing satellite network operated independently of the target satellite network and utilizing identical resources to the target satellite network,
   transmitting the signal to the user using the selected resources, when it is determined to transmit the signal to the user;
   receiving information about whether the transmission of the signal is successful or not from the user via a feedback channel after a delayed time, and
   updating an internal parameter of the reinforcement learning model with respect to the resources used for transmitting the signal.

9. The method of claim 8, wherein the determining whether to transmit the signal to the user comprises determining not to transmit the signal to the user when the collision probability is greater than the first threshold.

10. The method of claim 8, wherein the step of selecting the resources comprises selecting resources for transmitting the signal to the user independently of the adjacent existing satellite network using the same resources.

11. The method of claim 8, wherein
    the reinforcement learning model comprises a reinforcement learning model based on a multi-armed bandits (MAB) model, and
    the resources are modeled as an arm of the MAB model.

12. The method of claim 8, wherein the selecting the resources comprises selecting resources for transmitting the signal to the user based on the action derived based on an upper confidence bound (UCB) algorithm by the reinforcement learning model.

13. The method of claim 8, wherein the updating the internal parameter of the learning model comprises updating a state value and a reward value of the reinforcement learning model with respect to the resources used for transmitting the signal.

14. The method of claim 8, wherein the step of updating the internal parameter of the learning model comprises updating the internal parameter comprising at least one of each accumulative index of the resources, an accumulative average reward value, and a threshold for controlling the collision probability.

* * * * *